United States Patent
Carlson et al.

(10) Patent No.: US 11,952,028 B2
(45) Date of Patent: Apr. 9, 2024

(54) METHODS AND SYSTEMS FOR ACHIEVING VITAL ULTRA-WIDEBAND (UWB) BASED TRAIN CONTROL

(71) Applicant: Metrom Rail, LLC, Crystal Lake, IL (US)

(72) Inventors: Richard Carlson, Palatine, IL (US); John Albert Plutt, Jr., Arlington Heights, IL (US); Kurt Gunther, Woodstock, IL (US)

(73) Assignee: METROM RAIL, LLC, Crystal Lake, IL (US)

( * ) Notice: Subject to any disclaimer, the term of this patent is extended or adjusted under 35 U.S.C. 154(b) by 841 days.

(21) Appl. No.: 16/843,148

(22) Filed: Apr. 8, 2020

(65) Prior Publication Data

US 2020/0317235 A1  Oct. 8, 2020

Related U.S. Application Data

(60) Provisional application No. 62/830,780, filed on Apr. 8, 2019.

(51) Int. Cl.
*B61L 27/00* (2022.01)
*B61L 3/12* (2006.01)
(Continued)

(52) U.S. Cl.
CPC ........... *B61L 3/125* (2013.01); *B61L 15/0027* (2013.01); *B61L 15/0063* (2013.01);
(Continued)

(58) Field of Classification Search
CPC ...... B61L 3/125; B61L 15/0027; B61L 27/20; B61L 25/04; B61L 2027/204; B61L 15/0063; B61L 25/026
See application file for complete search history.

(56) References Cited

U.S. PATENT DOCUMENTS 2,188,293 A   1/1940  Williams
2,216,575 A  10/1940  Seinfeld et al.
(Continued)

FOREIGN PATENT DOCUMENTS

DE   102008020700   11/2009
EP   1785744        5/2007
(Continued)

OTHER PUBLICATIONS

International Search Report and Written Opinion for PCT/US2020/027219, dated Jun. 26, 2020, 12 pages.
(Continued)

*Primary Examiner* — Zachary L Kuhfuss
(74) *Attorney, Agent, or Firm* — McAndrews, Held & Malloy, Ltd.

(57) ABSTRACT

Systems and methods are provided for achieving vital ultra-wideband (UWB) based train control. Train-mounted units and wayside units that incorporate at least two separate and independent radios are used to obtain independent and separate ranging measurements in trains based on communications between the train-mounted units and wayside units. The communications includes communication of ultra-wideband (UWB) based signals.

25 Claims, 4 Drawing Sheets

(51) Int. Cl.
  *B61L 15/00* (2006.01)
  *B61L 25/02* (2006.01)
  *B61L 27/20* (2022.01)
  *B61L 25/04* (2006.01)

(52) U.S. Cl.
  CPC ............. *B61L 25/026* (2013.01); *B61L 27/00* (2013.01); *B61L 27/20* (2022.01); *B61L 25/04* (2013.01); *B61L 2027/204* (2022.01)

(56) References Cited

U.S. PATENT DOCUMENTS

| | | |
|---|---|---|
| 3,898,652 A | 8/1975 | Rashid |
| 5,036,478 A | 7/1991 | MacDougall |
| 5,283,589 A | 2/1994 | Blevins |
| 5,452,870 A | 9/1995 | Heggestad |
| 5,803,411 A * | 9/1998 | Ackerman .............. B61L 3/121 701/19 |
| 5,907,294 A | 5/1999 | Welte et al. |
| 5,950,966 A | 9/1999 | Hungate et al. |
| 6,023,239 A | 2/2000 | Kovach |
| 6,113,037 A | 9/2000 | Pace |
| 6,133,876 A | 10/2000 | Fullerton et al. |
| 6,597,293 B1 | 7/2003 | Harrison |
| 6,631,322 B1 | 10/2003 | Arthur et al. |
| 6,759,948 B2 | 7/2004 | Grisham et al. |
| 7,075,427 B1 | 7/2006 | Pace et al. |
| 7,148,791 B2 | 12/2006 | Grisham et al. |
| 7,725,252 B2 | 5/2010 | Heddebaut et al. |
| 8,874,359 B2 | 10/2014 | Douglas et al. |
| 9,434,397 B2 | 9/2016 | Chung et al. |
| 9,606,217 B2 | 3/2017 | Bruemmer et al. |
| 2004/0155822 A1 | 8/2004 | Lien |
| 2004/0240565 A1 | 12/2004 | Santhoff et al. |
| 2005/0143037 A1 | 6/2005 | Stratis et al. |
| 2006/0009240 A1 | 1/2006 | Katz |
| 2006/0199146 A1 | 9/2006 | Mandelkern et al. |
| 2007/0036069 A1 | 2/2007 | Wu et al. |
| 2007/0241888 A1 | 10/2007 | MantoVani et al. |
| 2007/0255498 A1 | 11/2007 | McDaniel et al. |
| 2007/0281745 A1 | 12/2007 | Parkulo et al. |
| 2007/0293153 A1 | 12/2007 | Molisch et al. |
| 2008/0150786 A1 | 6/2008 | Breed |
| 2008/0170533 A1 | 7/2008 | Cyzs et al. |
| 2009/0243397 A1 | 10/2009 | Cook et al. |
| 2009/0253439 A1 | 10/2009 | Gantner et al. |
| 2009/0255329 A1 | 10/2009 | Connell et al. |
| 2010/0039978 A1 | 2/2010 | Rangan |
| 2010/0052945 A1 | 3/2010 | Breed |
| 2010/0124898 A1 | 5/2010 | Qu et al. |
| 2010/0235460 A1 | 9/2010 | Mochizuki et al. |
| 2010/0278214 A1 * | 11/2010 | Westcott .............. H04B 1/7163 375/E1.001 |
| 2011/0006912 A1 | 1/2011 | Sheardown et al. |
| 2011/0084854 A1 | 4/2011 | Johnson |
| 2012/0077537 A1 | 3/2012 | Muratov et al. |
| 2012/0182191 A1 | 7/2012 | King |
| 2012/0296562 A1 * | 11/2012 | Carlson ................ B61L 25/025 701/301 |
| 2012/0326891 A1 | 12/2012 | Cross |
| 2013/0021215 A1 | 1/2013 | Suzuki et al. |
| 2013/0138276 A1 | 5/2013 | Soderi et al. |
| 2013/0214990 A1 | 8/2013 | Chiu |
| 2013/0237273 A1 | 9/2013 | Klein et al. |
| 2013/0256466 A1 | 10/2013 | Carlson et al. |
| 2014/0173155 A1 | 6/2014 | Slattery |
| 2015/0060608 A1 | 3/2015 | Carlson et al. |
| 2015/0097412 A1 | 4/2015 | Smith |
| 2015/0329130 A1 | 11/2015 | Carlson et al. |
| 2016/0046308 A1 | 2/2016 | Chung et al. |
| 2016/0068173 A1 * | 3/2016 | Fuchs .................. B61L 25/048 340/994 |
| 2016/0176422 A1 | 6/2016 | Cross |
| 2016/0194014 A1 * | 7/2016 | Rajendran ............... B61L 27/70 701/2 |
| 2019/0054942 A1 | 2/2019 | Carlson |
| 2019/0367064 A1 * | 12/2019 | Gunther ............... B60T 8/1705 |

FOREIGN PATENT DOCUMENTS

| | | |
|---|---|---|
| EP | 2571742 | 11/2009 |
| WO | 03009254 | 1/2003 |
| WO | 2013056244 | 4/2013 |

OTHER PUBLICATIONS

Certified English-Language Translation of German Patent Application Pub. No. DE102008020700A1 ("Meyer"), 13 pages.
IEEE Standard for Local and Metropolitan Area Networks: Part 15.4: Low-Rate Wireless Personal Area Networks (LR-WPANs), IEEE Std 802.15.4™-2011, Sep. 5, 2011, 314 pages.
Newton's Telecom Dictionary (27th ed 2013), 3 pages.
Time Domain's Ultra Wideband (UWB) Definition and Advantages, Time Domain (Mar. 2011), 14 pages.
Int. J. Its Res.(2016), "Assessment of the Contribution of Time Reversal of a UWB Localization System for Railway Application", 13 pages.
C. L. Bennett and G. F. Ross, "Time-domain electromagnetics and its applications," in Proceedings of the IEEE, vol. 66, No. 3, pp. 299-318, Mar. 1978, 23 pages.
An Outdoor UWB Tracking System to Improve Safety of Semi-Autonomous Vehicle Operations ("Richardson"), 13 pages.
"Driving Assistance Provided by Adaptive Cruise Control", P. Fancher, et al., University of Michigan Transportation Research Institute. 13 pages.
SAE J2735/2009-11, 359 pages.
"Operation of the Eaton VORAD Collision Warning System and Analysis of the Recorded Data", David A. Danaher, et al., Veritech Consulting Engineering, LLC., 10 pages.
"Transponder History—Radar Identification of Aircraft", Experimental Aircraft Info, Jul. 20, 2022, 5 pages.
"Collision of Metrolink Train 111 With Union Pacific Train LOF65-12", National Transportation Safety Board Accident Report, Sep. 12, 2008, 83 pages.
"Collisions & Casualties by Year", Federal Railroad Administration, 3 pages.
"Fatal Crashes at Highway Rail Grade Crossings", International Journal of Transportation Science and Technology, vol. 11, Issue 1, Mar. 2022, 23 pages.
"Highway-Rail Grade Crossings Overview", U.S. Department of Transportation, Federal Railroad Administration, Last updated: Wednesday, Dec. 4, 2019, 2 pages.
"Railroad Accident: Common Causes, Statistics and Prevention", 10 pages.
Positive Train Control, May 2012, 25 pages.
"CCS: A Railway Corridor Control System Utilizing UWB Radio Technology", Paul A. Flaherty, 2004 ASME/IEEE Joint Rail Conference, Apr. 6-8, 2004, 4 pages.
ETSI Technical Report 101 538 V1.1.1 (Oct. 2012), 34 pages.

* cited by examiner

METHODS AND SYSTEMS FOR ACHIEVING VITAL ULTRA-WIDEBAND (UWB) BASED TRAIN CONTROL

CLAIM OF PRIORITY

This patent application makes reference to, claims priority to, and claims benefit from U.S. Provisional Patent Application Ser. No. 62/830,780, filed on Apr. 8, 2019. The above identified application is incorporated herein by reference in its entirety.

TECHNICAL FIELD

Aspects of the present disclosure relate to control technologies and solutions in conjunction with railway systems. More specifically, various implementations of the present disclosure relate to methods and systems for achieving vital ultra-wideband (UWB) based train control.

BACKGROUND

Various issues may exist with conventional approaches for controlling trains and operations thereof. In this regard, conventional systems and methods, if any existed, for controlling trains and operations thereof, may be costly, inefficient, and cumbersome. Further limitations and disadvantages of conventional approaches will become apparent to one of skill in the art, through comparison of such systems with some aspects of the present disclosure as set forth in the remainder of the present application with reference to the drawings.

BRIEF SUMMARY

System and methods are provided for achieving vital ultra-wideband (UWB) based train control, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
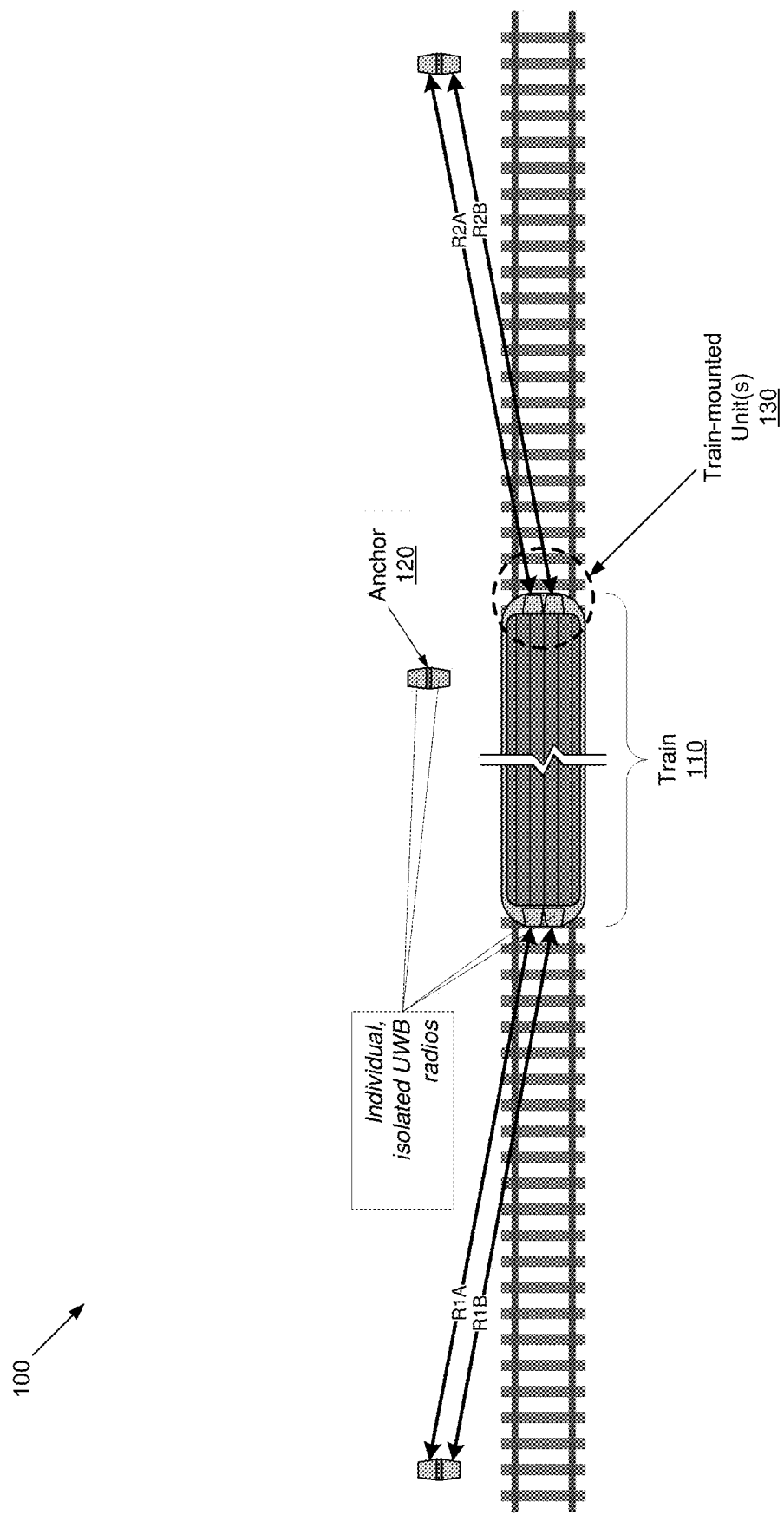
FIG. 1 illustrates an example system for achieving vital ultra-wideband (UWB) based train control, in accordance with the present disclosure.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

The present disclosure is directed to enhanced train control solutions, particularly through the use of methods and/or systems for achieving vital ultra-wideband (UWB) based train control. In this regard, for automatic train control applications, enforcing automatic train protection may preferably employ a fail-safe approach for providing protection against various potential safety related issues, such as train collisions, excessive train speed, and train movement into hazardous situations (e.g., into a track switch in an improper position, into an end-of-line barrier, etc.). In railroad applications, such fail-safe solutions are referred to as "vital." Thus, vital train control system may be a function within a safety critical system that has been implemented in a fail-safe manner. In this regard, fail-safe describes a design philosophy which ensures that a failure of the system will always place the system into a safe state.

In recent years, automatic train protection for transit applications has been accomplished using communications-based train control (CBTC) based systems. CBTC is a railway train protection/signaling system that makes use of wireless data communication between the train and track equipment. An essential function of a CBTC system is accurate measurement of train position. The accuracy of the train position measurement directly impacts the performance level of the train control system. Higher accuracy in train position measurement allows trains to be safely positioned closer together on the tracks, which in turn allows a higher density of trains to operate.

With increasing urban populations, transit agencies struggle to achieve the required density of trains to move riders in a timely fashion during peak transit periods. Improving train position accuracy supports a higher safe operating density of trains, improving throughput and passenger satisfaction without the increased capital expense for installation and operation of additional tracks.

Ultra-wideband (UWB) wireless technology offers improved accuracy in the determination of train position compared to conventional CBTC technology. In one example UWB-based train control implementation, UWB ranging radios are installed on trains and along the wayside. On the trains, the UWB ranging radios are installed on the two ends of each train unit (the smallest operable set of railcars). In this regard, a train may comprise one or more train units, and each train unit may comprise one or more cars. In some implementations, within train unit a multi-radio unit may be deployed the front and back of each unit. Along the wayside, UWB ranging radios (anchors) are installed periodically along each track at precisely recorded locations. This arrangement allows the train to determine its position continuously by ranging to nearby anchors and consulting a track map of the individual anchors to determine a track position from the measured distance to each indexed UWB anchor.

In order to realize the improved train position accuracy that UWB offers and apply this to automatic train protection, UWB-based train control systems may need to achieve vital (fail-safe) safety certification. Since UWB range measurements require complex processing, accomplishing fail-safe status in an UWB-based train control system may require careful analysis.

With respect to achieving vitality—that is confidence and/or reliability of performance—as noted above, a "vital" device must be fail-safe. To certify that a device is fail-safe in a safety-critical application, a qualified person (or examiner) in charge of examining the device may be tasked with studying the device "safety case." This may entail inspecting the device development process records and performing analysis and testing to confirm that the result of hardware failure or the effect of software error prohibits the device from assuming or maintaining an unsafe state or causes the device to assume a state known to be safe.

There may be two basic types of fail-safe circuits. The first type consists of an inherently fail-safe circuit (class I). The second type consists of non-inherently fail-safe circuits implemented with protections that result in fail-safe behavior (class II). Only relatively simple circuits support class I scrutiny, which involves exhaustive circuit analysis to demonstrate that all credible failure modes of any components will not result in an unsafe condition. Circuits with a processor (CPU) or integrated circuitry of anything more than minimal complexity generally are evaluated as class II circuitry in safety investigations. For class II safety analysis, the circuitry is analyzed at a functional block diagram level. The analysis must demonstrate that failures in vital functions will always have no unsafe effect. In some instances, a combination of safety assurance concepts to be applied to a device's circuitry, with the comprehensive whole of safety assurance concepts resulting in a vital declaration.

In a system configured for achieving vital UWB-based train control, UWB range measurements on a train may be used as the exclusive means for location, speed, direction of travel, (and possibly for other purposes, such as the occupied track, train polarity, and train orientation); and that data being used to enforce train protection, the system must be able to detect and respond in a vital fashion to invalid, incorrect, and unsuccessful ranging measurement attempts.

FIG. 1 illustrates an example system for achieving vital ultra-wideband (UWB) based train control, in accordance with the present disclosure. Shown in FIG. 1 is an example train control system 100 that may be configured for achieving vital ultra-wideband (UWB) based train control.

The train control system 100 may comprise train-mounted communication units 130 deployed on trains (e.g., train 110 in FIG. 1) interacting with wayside units 120 deployed along or near the tracks traverses by the trains. In this regard, the train 110 may operate within a railway network (e.g., transmit network). The wayside anchors 120, which may be configured for communicating with train-mounted control system, which comprise the train-mounted communication units 130. The train-mounted communication units 130 and the wayside anchors 120 comprise UWB radios and suitable circuitry, which may be configured for providing UWB-based train control, particularly one configured for vitality. In this regard, as noted above, achieving vitality for UWB train control may be done by use of UWB range measurements, which may be utilized on a train as the exclusive source for location, speed, and direction of travel determination, this invention describes a means of accomplishing this through a combination of class I and class II safety approaches.

In an example implementation, the train-mounted UWB train control system utilizes at least two independent control processors, with each processor having at least its own independent UWB range measurement radio. Each processor/UWB radio combination is galvanically isolated from the other, providing at least 2,000 VAC isolation to assure vital independence between the range measurement systems. This isolation satisfies the class I intrinsic safety requirement of completely independent systems on the train.

The UWB radios on the train (e.g., in the train-mounted communication units 130) perform time of flight range measurements to at least two independent UWB radios along the wayside anchors (UWB anchors). Each wayside-mounted UWB anchor radio is galvanically isolated from the other, providing at least 2,000 VAC isolation to assure independence between the range measurement systems. This isolation satisfies the class I intrinsic safety requirement of completely independent systems on the wayside. This redundant, isolated range-measurement architecture ensures that each independent processor on the train may independently perform range measurements to independent anchors on the wayside. Each UWB range measurement is targeted (addressed) to a specific wayside UWB anchor.

For example, as shown in the example implementation illustrated in FIG. 1, a dual independent radio architecture may be used—that is, with each anchor 120 and each train-based unit comprising two radios: an "A" radio and a "B" radio. In this regard, the "A" UWB radio on the train always ranges to the "A" UWB radio on the wayside. Likewise, the "B" UWB radio on the train always ranges to the "B" UWB radio on the wayside.

To further ensure independence, the train and wayside UWB "A" radio pairs may use an exclusive "channel" (e.g., unique data encoding sequence), while the train and wayside UWB "B" radio pairs use a different, incompatible, exclusive "channel" (e.g., unique data encoding sequence different than the one used for A radios). The use of differing encoding sequences ensures that range measurements are always targeted to the intended independent A or B UWB radio. In this approach, if there are additional radio pairs (such as radio pair "C", or radio pair "D"), each independent radio pair may also use an exclusive "channel."

In an example implementation, to further enhance vitality, there may be dual (e.g., R2A/R2B) range measurements to more than one anchor location (e.g., R3A/R3B, not shown in FIG. 1), where the results of additional anchor range measurements are compared to achieve vital status, at least initially, or periodically. In this regard, just one pair of range measurements may be used for updates, with periodic additional results used thereafter to confirm integrity.

The architecture for achieving vital train control, as used in various implementations in accordance with the present disclosure (e.g., in the implementation illustrated in FIG. 1), may allow each control processor on the train to request a range measurement request via its respective, independent train-mounted UWB ranging radio. This ranging request is addressed to a specific UWB ranging device at the intended anchor location. In this fashion, the two (or more) control processors may independently obtain a range measurement to independent UWB ranging radios at an anchor location. The resulting range measurement data is shared via a galvanically isolated communications link between processors. Consistency checks are performed on the measurement data, allowing acceptance of consistent measurements and rejection of inconsistent measurements. This cross-checking of independent results ultimately accomplishes a vital range measurement.

In some instances, independent UWB ranging radios may be mounted on the same end of the train, or at different places on the train, such as front and rear. If inconsistent range measurements are received, the measurements may be treated in various manners. For example, the measurement results may be rejected and discarded, waiting for a successful set of measurements which satisfy the vital range measurement criteria. Alternatively, the results may be compared to previous measurements and any significant outlying results ignored and discarded, such as a result where the measurement indicates the train accelerated by an implausible amount since the previous measurement or several measurements; where the remaining "accepted" measurement is marked as uncertain and used only tentatively. Another option may be to determine the most restrictive, "safest" measurement result of the two, and use that measurement as the tentative result—subject to rejection or elimination once a "vital" result is gained. There are other possible responses to inconsistent measurements; these are only several examples of possible responses to such measurements.

The architecture for achieving vital train control may be a combination of inherently fail-safe (class I) circuitry and process-induced fail-safe (class II) circuitry. The class I portion may be provided by isolation between the UWB positioning systems. Galvanic isolation provides electrical isolation between processing systems and between UWB radio systems. Messaging protocol provides communication isolation via unique addressing and encoding techniques. This isolation is verifiable by analysis and by measurement. The class II process-induced fail-safe portion of the fail-safe architecture may comprise the vital processing of UWB range measurements (verification of integrity through diverse measurements).

Figure 2:
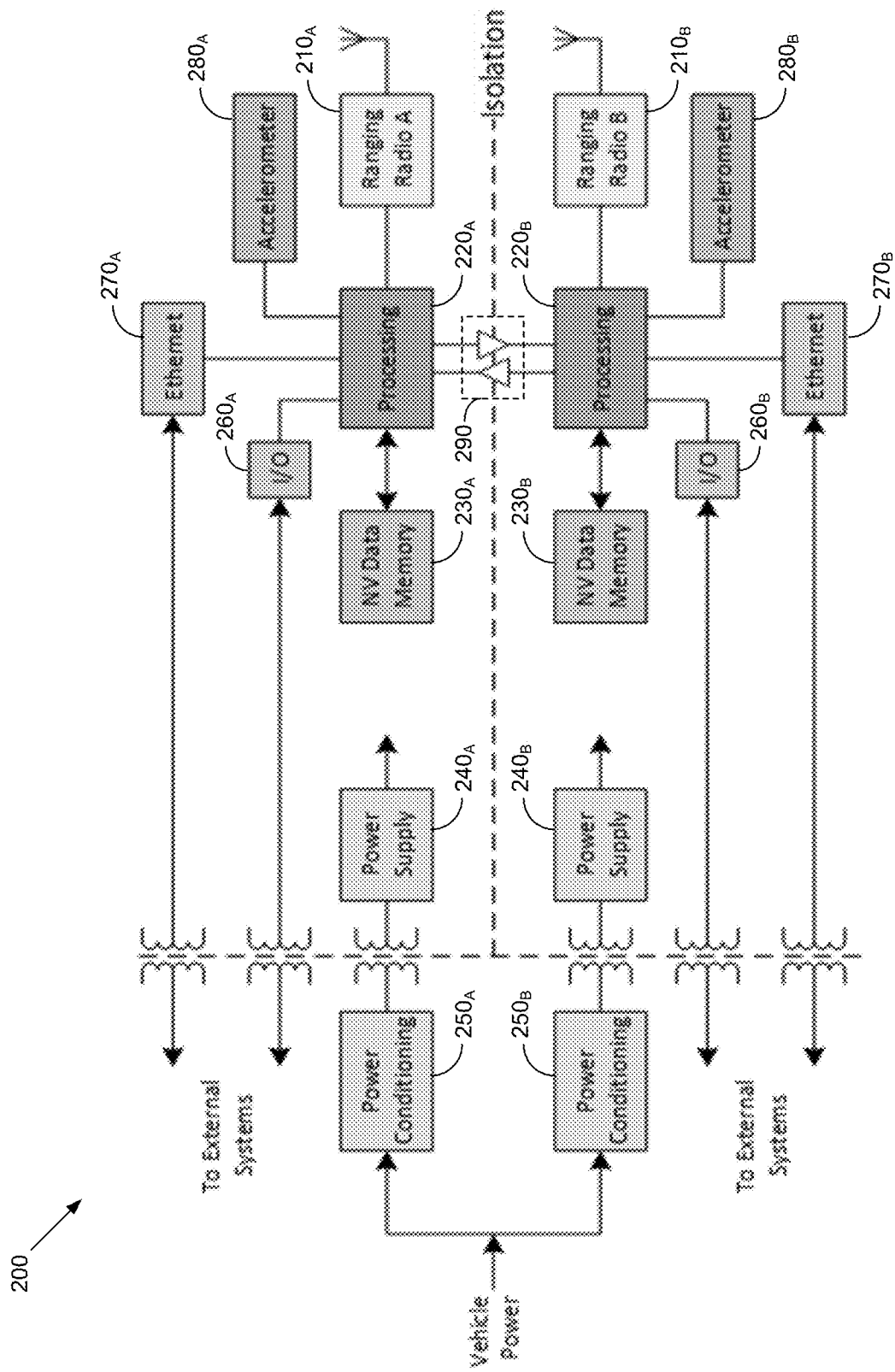
FIG. 2 illustrates an example train-mounted unit for use in a system for achieving vital ultra-wideband (UWB) based train control, in accordance with the present disclosure.

FIG. 2 illustrates an example train-mounted unit for use in a system for achieving vital ultra-wideband (UWB) based train control, in accordance with the present disclosure. Shown in FIG. 2 is a train-based unit 200.

The train-based unit 200 may comprise suitable hardware (including circuitry and/or other hardware components), software, and/or combination thereof for implementing various aspects of the present disclosure, particularly with respect to the train-mounted functionality in support of achieving vital ultra-wideband (UWB) based train control, as described with respect to FIG. 1.

The train-based unit 200 is configured for using and/or supporting multiple different channels (e.g., two different exclusive channels) for communications with wayside units, particularly via ultra-wideband (UWB) links. As shown in FIG. 2, for example, the train-based unit 200 is configured to support use of two channels (e.g., A and B). In this regard, the train-based unit 200 may be incorporate dual architecture for supporting isolated (e.g., using isolation barrier) ranging and processing circuitry configured for using distinct ranging channels A and B. Such dual architecture (and thus support to two isolated channels, which may be mirrored in the wayside units, allows redundant, independent collection and processing of range data, as well as cross-checking between the two channels to support the vital nature of the information obtained and provided to control systems associated with operation of the train. Nonetheless, the disclosure is not limited to implementations incorporating such separate architecture—e.g., with separate circuitry for handling different channels/radios. Accordingly, in some example implementations, UWB vitality may be achieved with a common UWB processing circuitry/engine, with the processing circuitry/engine being configured to achieve demonstrable independence (in handling and/or utilizing communications by the different radio), such as by logically partitioning computing, storage, and/or interface portions/resources.

In the example implementation illustrated in FIG. 2, for example, the train-based unit 200 comprises two ranging radios 210A and 2108, two processing circuits 220A and 220B, and two memory circuits (e.g., for non-volatile data storage) 230A and 230B, for handling the communication of the signals, and processing of the signals, and/or processing of data embedded into and/or extracted therefrom.

Additional circuitry may be used for supporting the operation of the ranging radios, such as with respect to providing power, for facilitating interactions with the radios, and/or for providing additional information, etc. For example, the train-based unit 200 may comprise two power supply circuits 240A and 240B, and two power conditioning circuits 250A and 250B, which may be configured for supplying power to the components of the unit, particularly by obtaining the power from the vehicle (train) mounting the unit. In this regard, the two power conditioning circuits 250A and 250B may be configured for conditioning power obtained from the vehicle for use within the unit. The train-based unit 200 may also comprise two input/output (I/O) circuits 260A and 260B, two Ethernet circuits 270A and 220B, and two accelerometer circuits 280A and 280B.

The per-channel circuitry may be implemented such that it maintains isolation between the channels (e.g., using isolation barrier). For example, by using separate circuits, each channel is isolated from the other, and from the external power, communications, and I/O systems. Further, interactions between channels occurs only between the processing blocks across the isolation barrier, e.g., using isolation buffers (isolation buffers 290 as shown in FIG. 2) to maintain isolation. Further, each channel has a dedicated accelerometer (one of accelerometer circuits 280A and 280B) which may be used as an alternate or cross-check source of motion information.

Various techniques and/or measures may be used to achieve and maintain Isolation between the ranging radios and processing channels. For example, the ranging radios 210A and 2108 may use separate channels differentiated by the pseudo-random pulse interval sequence they employ, which allows the radios to operate in the same frequency band. Alternatively or additionally, the radios and associated circuitry may be galvanically isolated from each other.

Figure 3:
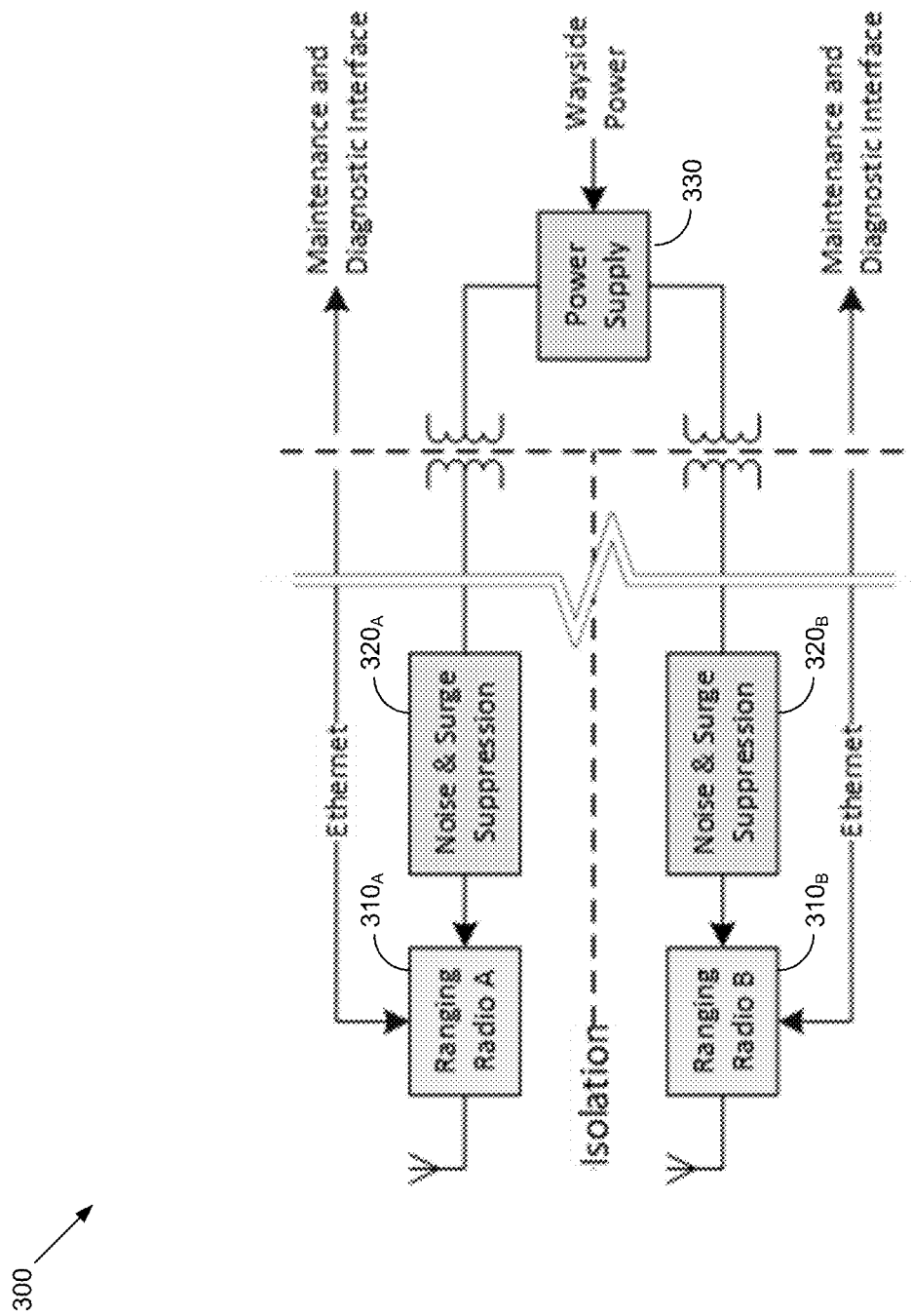
FIG. 3 illustrates an example wayside unit for use in a system for achieving vital ultra-wideband (UWB) based train control, in accordance with the present disclosure.

FIG. 3 illustrates an example wayside wireless train communication system (WTCS) unit, in accordance with the present disclosure. Shown in FIG. 3 is a wayside unit 300.

The wayside unit 300 may comprise suitable hardware (including circuitry and/or other hardware components), software, and/or combination thereof for implementing various aspects of the present disclosure, particularly with respect to the wayside functionality in support of achieving vital ultra-wideband (UWB) based train control, as described with respect to FIG. 1.

As with the train-based unit, the wayside unit 300 is configured for using and/or supporting multiple different channels (e.g., two different exclusive channels) for communications with train-based units, particularly via ultra-wideband (UWB) links. As shown in FIG. 3, for example, the wayside unit 300 is configured to support use of two distinct and exclusive channels (e.g., A and B), and may similarly incorporate dual architecture for supporting isolated (e.g., using isolation barrier) ranging radios and related circuitry for facilitating use of channels A and B (e.g., as ranging channels). Nonetheless, the disclosure is not limited to implementations incorporating such separate architecture—e.g., with separate circuitry for handling different channels/radios. Accordingly, in some example implementations, UWB vitality may be achieved with a common UWB processing circuitry/engine, with the processing circuitry/engine being configured to achieve demonstrable independence (in handling and/or utilizing communications by the different radio), such as by logically partitioning computing, storage, and/or interface portions/resources.

For example, the wayside unit 300 comprises two ranging radios 310A and 3108, two processing circuits (e.g., configured for noise and surge compression) 320A and 320B, and a power supply 330. The ranging radios 310A and 3108 are isolated from each other and the wayside power system, such as using isolation barrier. In some instances, the ranging radios 310A and 3108 may support communications (e.g., via Ethernet interface(s)/link(s)). These communication links to the radios 310A and 3108 may support configuration and diagnostic/maintenance activities as needed, for example.

The wayside unit 300 may be configured to operate collaboratively with the train-based units (e.g., the train-based unit 300) to facilitate particularly with respect to the wayside functionality in support of achieving vital ultra-wideband (UWB) based train control. In example operation, as a train moves through the transit system the train-based unit maintains contact with a number of wayside units ahead and regularly determines its distance to each of them. These distances are used to determine the train's location within the transit system. Thus, the train is able to maintain certainty about which wayside unit is associated with each distance measurement because each ranging radio has a unique addresses, and only a radio specifically addressed will respond to a range request. The addresses of the A and B radios in each wayside unit are included in the system map.

Figure 4:
FIG. 4 illustrates an example system for achieving vital ultra-wideband (UWB) based train control using spatial diversity, in accordance with the present disclosure.

FIG. 4 illustrates an example system for achieving vital ultra-wideband (UWB) based train control using spatial diversity, in accordance with the present disclosure. Shown in FIG. 4 is an example train control system 400 that may be configured for achieving vital ultra-wideband (UWB) based train control.

The train control system 400 may be similar to the train control system 100, as described with respect to FIG. 1, thus similarly comprising train-mounted communication units 430 deployed on trains (e.g., train 410 in FIG. 4) interacting with wayside units 420 deployed along or near the tracks traverses by the trains. In this regard, the train-mounted units 430 and the wayside units 420 may be configured for communicating, preferably using ultra-wideband (UWB) signals, in a manner that enable achieving vital UWB-based train control, as described above. For example, the train-mounted communication units 430 and the wayside anchors 420 comprise UWB radios and suitable circuitry, which may be configured for providing UWB-based train control, particularly one configured for vitality.

However, the train control system 400 may be additionally configured to support and/or incorporate use of spatial diversity in conjunction with communications between the train-mounted units and the wayside unit for achieving vitality. In this regard, spatial diversity may be achieved based on optimized placement of the UWB radios and/or antennas associated therewith, on the trains and on the wayside—that is, the physical position(s) of the radios and/or their antennas may be selected and/or arranged such that the radios/antenna may be sufficiently diverse from each other to protect against multipath distortion errors.

In example implementations, one or more of radios of the train-mounted units and/or the wayside units may incorporate multiple antennas, which may be separated (e.g., separately mounted) to achieve desired spatial diversity. In this regard, spatial diversity may be achieved based on adaptive spacing of the antennas. For example, as shown in FIG. 4, each of the radios (A and B) of the train-mounted unit 430 may be implemented with multiple antennas (optionally, each having corresponding separate sub-unit for handling operation thereof) with these antennas (e.g., TA1 and TA2 for radio A, and TB1 and TB2 for radio B) separated to optimize spatial diversity. Further, in some instances, similar structure/arrangement may be used in the wayside units. Thus, each of the wayside units $420_1$ and $420_2$ shown in FIG. 4 may similarly incorporate use of radios with multiple antennas with corresponding separate processing units (and, in some instances, enclosures) for handling operation of these antennas (e.g., $W_{A1}$ and $W_{A2}$ for radio A, and $W_{B1}$ and $W_{B2}$ for radio B) which are separated to optimize spatial diversity. Accordingly, as illustrated in FIG. 4, various configurations may be used. For example, wayside units may incorporate and/or utilize various configurations, such as based on number of radios, antennas, processing circuitry, etc. used therein. In this regard, as noted above, while some example implementations incorporating may incorporate separate architecture—e.g., with separate circuitry for handling different channels/radios, in other example implementations, UWB vitality may be achieved with a common UWB processing circuitry/engine configured to achieve demonstrable independence, such as by logically partitioning computing, storage, and/or interface portions/resources. In an example implementation, a wayside unit (e.g., wayside unit $420_1$ but similarly any/some/all other wayside units, including wayside unit $420_2$) may comprise two independent UWB processing systems/radio/antenna combinations, all part of one anchor enclosure ($W_{A1}$ and $W_{B1}$).

In another example implementation, a wayside unit (e.g., wayside unit $420_1$ but similarly any/some/all other wayside units, including wayside unit $420_2$) may comprise two independent UWB processing systems/radio/antenna combinations, each independent system in their own separate enclosure, installed on a common mounting bracket ($W_{A1}$ and $W_{B1}$).

In another example implementation, a wayside unit (e.g., wayside unit $420_1$ but similarly any/some/all other wayside units, including wayside unit $420_2$) may comprise two independent UWB processing systems/radio/antenna combinations, each independent system in their own separate enclosure, installed in separate mountings, but nearby locations ($W_{A1}$ and $W_{B1}$).

In another example implementation, a wayside unit (e.g., wayside unit $420_1$ but similarly any/some/all other wayside units, including wayside unit $420_2$) may comprise two independent UWB radios and associated antennas, with a common UWB processing engine, where the processing engine achieves demonstrable independence by logically partitioning the computing, storage, and/or interface portions, each part of the same anchor enclosure ($W_{A1}$ and $W_{B1}$).

In another example implementation, a wayside unit (e.g., wayside unit $420_1$ but similarly any/some/all other wayside units, including wayside unit $420_2$) may comprise two independent UWB processing systems and radios, with two antennas each, for a total of four antennas, all part of one anchor enclosure.

In another example implementation, a wayside unit (e.g., wayside unit $420_1$ but similarly any/some/all other wayside units, including wayside unit $420_2$) may comprise two independent UWB processing systems/radios, with two antennas for each system, for a total of four antennas, each system/radio and their respective antennas in their own separate enclosure, installed on a common mounting bracket.

In another example implementation, a way wayside unit (e.g., wayside unit $420_1$ but similarly any/some/all other wayside units, including wayside unit $420_2$) may comprise two independent UWB processing systems/radios, with two antennas each, for a total of four antennas, each system/radio and respective antennas in their own separate enclosure, installed in separate, but nearby locations.

In another example implementation, a wayside unit (e.g., wayside unit $420_1$ but similarly any/some/all other wayside units, including wayside unit $420_2$) may comprise two independent UWB radios and associated pairs of antennas for each radio, with a common processing engine, where the processing engine achieves demonstrable independence by logically partitioning the computing, storage, and/or interface portions, each part of the same anchor enclosure.

In another example implementation, a wayside unit (e.g., wayside unit $420_1$ but similarly any/some/all other wayside units, including wayside unit $420_2$) may comprise four independent UWB processing systems/radio/antenna combinations, each part of one anchor enclosure ($W_{A1}$, $W_{A2}$, $W_{B1}$, $W_{B2}$), where the additional processing systems/radios (e.g., radios numbered "2") are included for reliability redundancy.

In another example implementation, a wayside unit (e.g., wayside unit $420_1$ but similarly any/some/all other wayside units, including wayside unit $420_2$) may comprise any configuration of the ones described above, except with double the number of UWB systems.

The separation of the antenna may be adaptively determined to optimize spatial diversity, such as based on particular applicable criteria (e.g., characteristics of the communications and/or communicated signals). For example, spatial diversity may be achieved by placing the antennas at least a wavelength apart. Thus, to achieve spatial diversity with UWB based communication, for example, the antennas may be placed relatively at short distance (e.g., ~4 inches). Thus, to achieve spatial diversity, in an example implementation, the antennas on the train might be spaced at least 4 inches apart on the face (front and/or back) of the train car, and the wayside anchor antennas might be at least 4 inches apart on the wall of a tunnel, or via a mounting bracket on the wall. However, for practical reasons (e.g., to reduce cost and/or complexity), not all antennas may be spaced precisely based on the minimal required spacing. For example, in some implementations, along the wayside, the antennas likely would be much more than 4 inches apart to prevent blocking the signal from the other nearby antenna.

An example system for achieving train control vitality, in accordance with the present disclosure, comprises a train-mounted device configured for use within a train to achieving train control vitality, the train-mounted device comprising: at least two independent ranging radios, each ranging radios comprising one or more antennas, configured for transmitting and/or receiving wireless signals; and circuitry configured to control operations of the train-mounted device, wherein the circuitry is configured to at least process signals transmitted and/or received via the at least two independent ranging radios; wherein the at least two independent ranging radios and the circuitry are configured to maintain isolation during communication of signals; and wherein the train-mounted device is configured to, during operation of the train within a railway network: communicate with any wayside unit that comes within communication range of the train-mounted unit; processing the communicated signals; and generate based on the processing of the communicated signals, at least two separate and independent measurement data, corresponding to communication via the at least two independent ranging radios.

In an example implementation, the at least two independent ranging radios are configured for communication of ultra-wideband (UWB) based signals, and wherein the circuitry is configured to: communicate with any wayside unit that comes within communication range of the train-mounted unit, wherein the communicating comprises transmission and/or reception of ultra-wideband (UWB) based signals; processing ultra-wideband (UWB) based signals transmitted and/or received via the at least two independent ranging radios; and generate the at least two separate and independent measurement data based on the processing of the ultra-wideband (UWB) based signals.

In an example implementation, the circuitry comprises one or more of at least one processing circuit, at least one storage circuit, at least one interfacing circuit, at least one Ethernet circuit, and at least one of power circuit.

In an example implementation, the circuitry comprises at least two separate and independent sets of circuitry, each set of circuitry associated with one of the at least two independent ranging radios.

In an example implementation, the circuitry comprises at least two independent processor circuits, each processor circuits associated with one of the at least two independent ranging radios.

In an example implementation, the circuitry comprises one or more power circuits configured for supplying power to components of the train-mounted device. The one or more power circuits may be configured for obtaining power from the train.

In an example implementation, the train-mounted device is configured to generate or adjust, at least in part, the at least two separate and independent measurement data based on sources other than the processing of the communicated signals. The sources may comprise one or more sensor components on the train, and wherein the circuitry comprise one or more circuits configured to interact with the one or more sensor components. The one or more sensor components may comprise at least one accelerometer, and wherein the one or more circuits comprise one or more accelerometer circuits.

In an example implementation, at least one of the at least two independent ranging radios is configured for supporting spatial diversity during communication of signals with at least one wayside unit. The one or more antennas of the at least one of the at least two independent ranging radios may be arranged for supporting spatial diversity, the arranging comprising spacing the one or more antennas based on one or more parameter or characteristic of the signals communicated with the at least one wayside unit.

An example system for achieving train control vitality, in accordance with the present disclosure, comprises a wayside device configured for deployment on or near tracks within a railway network for supporting achieving train control vitality, the wayside device comprising: at least two independent ranging radios, each ranging radios comprising one or more antennas, configured for transmitting and/or receiving wireless signals; and circuitry configured to control operations of the wayside device, wherein the circuitry is configured to at least process signals transmitted and/or received via the at least two independent ranging radios; wherein the at least two independent ranging radios and the circuitry are configured to maintain isolation during communication of signals; and wherein the wayside device is configured to communicate with any train-mounted unit, configured for use within a train to support achieving train control vitality, when the train-mounted unit comes within communication range of the train-mounted unit.

In an example implementation, the at least two independent ranging radios are configured for communication of ultra-wideband (UWB) based signals.

In an example implementation, the circuitry comprises at least two separate and independent sets of circuitry, each set of circuitry associated with one of the at least two independent ranging radios.

In an example implementation, the circuitry comprises at least two independent processor circuits, each processor circuits associate with one of the at least two independent ranging radios.

In an example implementation, the circuitry comprises one or more power circuits configured for supplying power to components of the wayside device.

In an example implementation, at least one of the at least two independent ranging radios is configured for supporting spatial diversity during communication of signals with at least one train-mounted unit. The one or more antennas of the at least one of the at least two independent ranging radios may be arranged for supporting spatial diversity, and wherein arranging the one or more antennas comprises spacing the one or more antennas based on one or more parameter or characteristic of the signals communicated with the at least one train-mounted unit.

An example system for achieving train control vitality, in accordance with the present disclosure, comprises a plurality of wayside units, each configured for deployment on or near tracks in the railway network; and one or more train-mounted units, each configured for deployment on a train operating in the railway network; wherein: each of at least one train-mounted unit and one or more of the plurality of wayside units: comprises at least two independent ranging radios, each ranging radios comprising one or more antennas, configured for transmitting and/or receiving wireless signals; and is configured to maintain isolation during communication of signals; the at least one train-mounted unit is configured to, during operation of the train within the railway network: communicate with any wayside unit that comes within communication range of the train-mounted unit; processing the communicated signals; and when communicating with any of the one or more of the plurality of wayside units, generate based on the processing of the communicated signals, at least two separate and independent measurement data, corresponding to communication via the at least two independent ranging radios.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, causing the machine and/or computer to perform the processes as described herein.

Various embodiments in accordance with the present invention may be realized in hardware, software, or a combination of hardware and software. The present invention may be realized in a centralized fashion in at least one computing system, or in a distributed fashion where different elements are spread across several interconnected computing systems. Any computing system or other apparatus adapted for carrying out the methods described is suited. A typical combination of hardware and software may be a general-purpose computing system with a program or other code that, when being loaded and executed, controls the computing system so it carries out the methods described. Another typical implementation may comprise an application specific integrated circuit or chip.

Various embodiments in accordance with the present invention may also be embedded in a computer program product, which comprises all the features enabling the implementation of the methods described, and which when loaded in a computer system can carry out these methods. Computer program in the present context means any expression, in any language, code or notation, of a set of instructions intended to cause a system having an information processing capability to perform a particular function either directly or after either or both of: a) conversion to another language, code or notation; b) reproduction in a different material form.

While the present invention has been described referring to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for achieving train control vitality, the system comprising:
   a train-mounted device configured for use within a train to achieving train control vitality, the train-mounted device comprising:
      at least two independent ranging radios, each ranging radio comprising one or more antennas, configured for transmitting and/or receiving wireless signals; and
      circuitry configured to control operations of the train-mounted device, wherein the circuitry is configured to at least process signals transmitted and/or received via the at least two independent ranging radios;
wherein the at least two independent ranging radios and the circuitry are configured to maintain isolation during communication of signals, wherein:
the train-mounted device is configured for supporting use of a plurality of different exclusive channels,
at least two of the plurality of different exclusive channels use a same frequency,
maintaining the isolation during the communication of signals comprises assigning to each of the at least two independent ranging radios different channel from the plurality of different exclusive channels, and
when channels assigned to the at least two independent ranging radios use a same frequency, the maintaining of the isolation comprises applying one or more measures to account for use of a same frequency; and
wherein the train-mounted device is configured to, during operation of the train within a railway network:
communicate with any wayside unit that comes within communication range of the train-mounted device;
processing the communicated signals; and
generate based on the processing of the communicated signals, at least two separate and independent measurement data, corresponding to communication via the at least two independent ranging radios.

2. The system of claim 1, wherein the at least two independent ranging radios are configured for communication of ultra-wideband (UWB) based signals, and wherein the circuitry is configured to:
communicate with any wayside unit that comes within communication range of the train-mounted device, wherein the communicating comprises transmission and/or reception of ultra-wideband (UWB) based signals;
processing ultra-wideband (UWB) based signals transmitted and/or received via the at least two independent ranging radios; and
generate the at least two separate and independent measurement data based on the processing of the ultra-wideband (UWB) based signals.

3. The system of claim 1, wherein the circuitry comprises one or more of at least one processing circuit, at least one storage circuit, at least one interfacing circuit, at least one Ethernet circuit, and at least one of power circuit.

4. The system of claim 1, wherein the circuitry comprises at least two separate and independent sets of circuitry, each set of circuitry associated with one of the at least two independent ranging radios.

5. The system of claim 1, wherein the circuitry comprises at least two independent processor circuits, each processor circuits associated with one of the at least two independent ranging radios.

6. The system of claim 1, wherein the circuitry is configured to implement at least two logical partitions, wherein each logical partition is configured for handling one or more of processing, storage, and interface functions one of the at least two independent ranging radios.

7. The system of claim 1, wherein the circuitry comprises one or more power circuits configured for supplying power to components of the train-mounted device.

8. The system of claim 7, wherein the one or more power circuits are configured for obtaining power from the train.

9. The system of claim 1, wherein the train-mounted device is configured to generate or adjust, at least in part, the at least two separate and independent measurement data based on sources other than the processing of the communicated signals.

10. The system of claim 9, wherein the sources comprise one or more sensor components on the train, and wherein the circuitry comprise one or more circuits configured to interact with the one or more sensor components.

11. The system of claim 10, wherein the one or more sensor components comprise at least one accelerometer, and wherein the one or more circuits comprise one or more accelerometer circuits.

12. The system of claim 1, wherein at least one of the at least two independent ranging radios is configured for supporting spatial diversity during communication of signals with at least one wayside unit.

13. The system of claim 12, wherein the one or more antennas of the at least one of the at least two independent ranging radios are arranged for supporting spatial diversity, the arranging comprising spacing the one or more antennas based on one or more parameter or characteristic of the signals communicated with the at least one wayside unit.

14. The system of claim 1, wherein applying the one or more measures to account for use of the same frequency comprises assigning different unique data encoding sequences to the at least two independent ranging radios.

15. A system for achieving train control vitality, the system comprising:
a wayside device configured for deployment on or near tracks within a railway network for supporting achieving train control vitality, the wayside device comprising:
at least two independent ranging radios, each ranging radio comprising one or more antennas, configured for transmitting and/or receiving wireless signals; and
circuitry configured to control operations of the wayside device, wherein the circuitry is configured to at least process signals transmitted and/or received via the at least two independent ranging radios;
wherein the at least two independent ranging radios and the circuitry are configured to maintain isolation during communication of signals, wherein:
the wayside device is configured for supporting use of a plurality of different exclusive channels,
at least two of the plurality of different exclusive channels use a same frequency,
maintaining the isolation during the communication of signals comprises assigning to each of the at least two independent ranging radios different channel from the plurality of different exclusive channels, and
when channels assigned to the at least two independent ranging radios use a same frequency, the maintaining of the isolation comprises applying one or more measures to account for use of a same frequency; and
wherein the wayside device is configured to communicate with any train-mounted unit, configured for use within a train to support achieving train control vitality, when the train-mounted unit comes within communication range of the train-mounted unit.

16. The system of claim 15, wherein the at least two independent ranging radios are configured for communication of ultra-wideband (UWB) based signals.

17. The system of claim 15, wherein the circuitry comprises at least two separate and independent sets of circuitry, each set of circuitry associated with one of the at least two independent ranging radios.

18. The system of claim 15, wherein the circuitry comprises at least two independent processor circuits, each processor circuits associate with one of the at least two independent ranging radios.

19. The system of claim 15, wherein the circuitry is configured to implement at least two logical partitions, wherein each logical partition is configured for handling one or more of processing, storage, and interface functions one of the at least two independent ranging radios.

20. The system of claim 15, wherein the circuitry comprises one or more power circuits configured for supplying power to components of the wayside device.

21. The system of claim 15, wherein at least one of the at least two independent ranging radios is configured for supporting spatial diversity during communication of signals with at least one train-mounted unit.

22. The system of claim 21, wherein the one or more antennas of the at least one of the at least two independent ranging radios are arranged for supporting spatial diversity, and wherein arranging the one or more antennas comprises spacing the one or more antennas based on one or more parameter or characteristic of the signals communicated with the at least one train-mounted unit.

23. The system of claim 15, wherein applying the one or more measures to account for use of the same frequency comprises assigning different unique data encoding sequences to the at least two independent ranging radios.

24. A system for supporting achieving train control vitality in a railway network, the system comprises:
a plurality of wayside units, each configured for deployment on or near tracks in the railway network; and
one or more train-mounted units, each configured for deployment on a train operating in the railway network;
wherein each of at least one train-mounted unit and one or more of the plurality of wayside units:
comprises at least two independent ranging radios, each ranging radio comprising one or more antennas, configured for transmitting and/or receiving wireless signals;
configured for supporting use of a plurality of different exclusive channels, with at least two of the plurality of different exclusive channels using a same frequency; and
configured to maintain isolation during communication of signals, wherein:
maintaining the isolation during the communication of signals comprises assigning to each of the at least two independent ranging radios different channels from the plurality of different exclusive channels; and
when channels assigned to the at least two independent ranging radios use a same frequency, the maintaining of the isolation comprises applying one or more measures to account for use of a same frequency; and
wherein the at least one train-mounted unit is configured to, during operation of the train within the railway network:
communicate with any wayside unit that comes within communication range of the train-mounted unit;
processing the communicated signals; and
when communicating with any of the one or more of the plurality of wayside units, generate based on the processing of the communicated signals, at least two separate and independent measurement data, corresponding to communication via the at least two independent ranging radios.

25. The system of claim 24, wherein applying the one or more measures to account for use of the same frequency comprises assigning different unique data encoding sequences to the at least two independent ranging radios.

* * * * *